United States Patent [19]

Goehring

[11] 3,931,378

[45] Jan. 6, 1976

[54] FOAM BEAD BOTTOM PLASTIC CUP AND METHOD OF MAKING SAME

[75] Inventor: Clifford Clayton Goehring, Princeton, N.J.

[73] Assignee: American Can Company, Greenwich, Conn.

[22] Filed: June 17, 1974

[21] Appl. No.: 480,301

Related U.S. Application Data

[62] Division of Ser. No. 256,347, May 24, 1972, abandoned.

[52] U.S. Cl.............. 264/45.4; 229/1.5 B; 264/53; 264/259; 264/321
[51] Int. Cl.²......................................... B29D 27/00
[58] Field of Search...... 264/51, 52, 321, 259, 1.5 B

[56] References Cited
UNITED STATES PATENTS

| | | | |
|---|---|---|---|
| 3,069,725 | 12/1962 | Root | 264/51 |
| 3,315,018 | 4/1967 | Commeyras | 264/52 X |
| 3,344,222 | 9/1967 | Shapiro et al | 264/51 X |
| 3,673,033 | 6/1972 | MacDaniel et al. | 264/248 X |
| 3,792,137 | 2/1974 | Seto | 264/321 X |

*Primary Examiner*—Philip Anderson
*Attorney, Agent, or Firm*—Robert P. Auber; Ernestine C. Bartlett; George P. Ziehmer

[57] ABSTRACT

Cups having a plastic, foam sheet sidewall are molded with bottom walls made from pre-expanded, plastic, foam beads. The beads are injected into the bottom of the mold cavity, and steam is introduced into the mold cavity to simultaneously fuse and mold the cup.

6 Claims, 3 Drawing Figures

FOAM BEAD BOTTOM PLASTIC CUP AND METHOD OF MAKING SAME

This is a division of application Ser. No. 256,347, filed May 24, 1972 now abandoned.

BACKGROUND OF THE INVENTION

This invention relates to the manufacture of plastic cups, and more particularly to drinking cups made from both plastic, foam sheet and plastic, foam beads.

Foam plastic drinking cups have gained a substantial portion of the market which formerly used only cups made of paper. A large number of these plastic drinking cups are manufactured by a bead molding process. However, this process presents two obstacles: due to expansion of the beads, the cup cannot be made thin enough for many applications, and, the cup cannot be printed prior to its assembly. These problems gave rise to a second method of manufacturing plastic foam cups, wherein two pieces of foam sheet are molded to form the cup. The foam sheet method requires that the cup bottom be blanked and shaped prior to molding. Shaping the bottom into a cup-like section before placing it in the mold has proved to be very difficult. The instant invention, therefore, eliminates the bottom forming steps while retaining the advantages of a foam sheet sidewall.

SUMMARY OF THE INVENTION

The present invention provides a method of making a disposable, plastic foam, heat sealed cup comprising a plastic, foam sheet sidewall having a fusion sealed, lapped seam, the lapped seam and the sidewall immediately adjacent the lapped seam being of identical thickness, and a pre-expanded, plastic, foam bead bottom wall fusion sealed to the sidewall.

The instant invention also provides a method of making a disposable, plastic foam cup which comprises cutting a blank from a plastic, foam sheet to form the cup sidewall, expanding plastic, foam beads, placing the sidewall blank in a female mold, placing the pre-expanded foam beads into the bottom of the mold cavity, closing the mold and heating the mold cavity whereby the cup is simultaneously fused and molded.

DESCRIPTION OF THE PREFERRED EMBODIMENT

Figure 1:
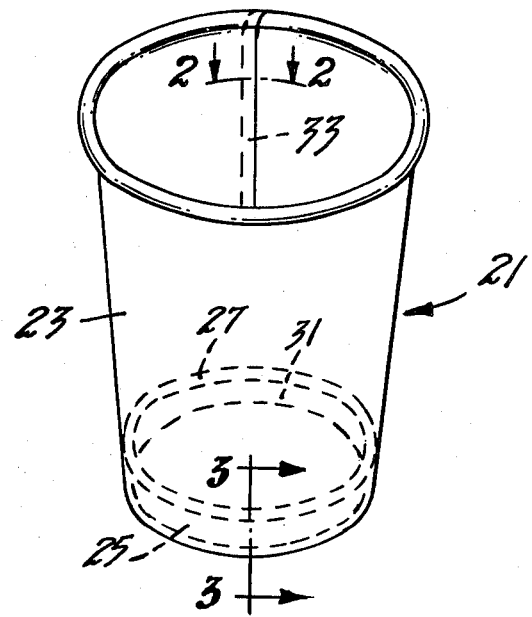
FIG. 1 is a perspective view of a cup of the present invention.
Figure 3:
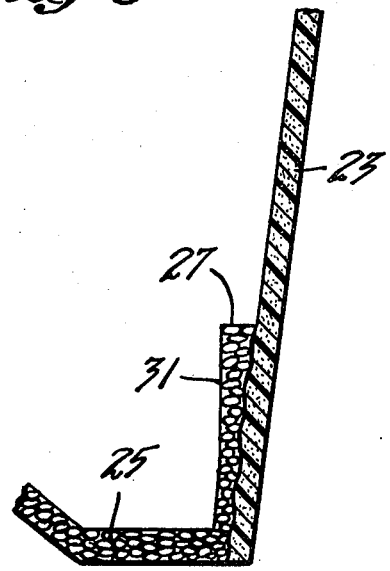
FIG. 3 is an enlarged, fragmentary, sectional view taken on the vertical plane indicated by the line 3—3 of FIG. 1.

A cup 21 made according to the present invention is shown in FIG. 1. The sidewall 23 of the cup 21 is formed from plastic, foam sheet. The cup bottom wall 25 is formed from pre-expanded, plastic, foam beads. Since the sidewall 23 is formed from foam sheet which is expandable, a stacking ledge 27 (see FIG. 3) can be molded into the cup 21.

Figure 2:
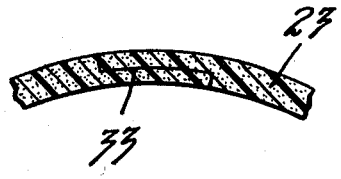
FIG. 2 is an enlarged, fragmentary, sectional view taken on the horizontal place indicated by the line 2—2 of FIG. 1.

The cup 21 is characterized by leakproof compression seals which are created between the upturned portion 31 of the bottom wall 25 and the sidewall 23 (see FIG. 3), and along lapped seam 33 of the sidewall 23 (see FIG. 2). The leakproof compression seal on the bottom wall 25 is formed during molding by compressing the bottom wall upturned portion 31 and the sidewall 23 together. Compressive forces are also exerted along the entire lapped seam 33.

Another characteristic of the cup 21 is the identical thickness of the sidewall lapped seam 33 and the sidewall 23 immediately adjacent the seam 33. As seen in FIG. 2, the sidewall 23 overlaps on itself, but in molding, the lapped seam 33 is compressed to the thickness of the mold cavity. The adjacent portion of the sidewall 23 freely expands to the identical thickness. It should be noted that ribs, protrusions or depressions could be introduced on the sidewall 23 other than on the lapped seam 33.

The preferred method of making the cup 21 starts with extruding foam sheet from either polystyrene or rubber modified polystyrene to make the sidewall 23. It is suggested that the extruded foam sheet have a density of 16 to 17 pounds per cubic foot and a thickness of 35 to 40 mils. In practice the initial thickness of the extruded sheet is unimportant; only the final desired weight per unit of surface area is important.

The foam sheet is extruded from a blend of polystyrene resin, nucleating agent and lubricant into which a gaseous hydrocarbon has been injected. Normal pentane is the gaseous hydrocarbon which allows the foam, if desired, to be easily compressed either in-line with the foam extrusion operation or up to several months after extrusion.

After the foam sheet is extruded to a thickness of 35 to 40 mils, it is preferably mechanically compressed, either in-line with the extrusion operation, or up to several months thereafter, to a thickness of about 23 to 26 mils. The foam sheet now may be printed if desired and slit to the widths required by the cup size to be made.

Expandable polystyrene beads having a density of about 40–70 pounds per cubic foot are pre-expanded, using steam, hot air, or boiling water, among other techniques, to a lower density, such as 2–5 pounds per cubic foot, for both processing and economic purposes. The beads include a blowing agent, such as pentane, and are about 0.5 mm. in diameter. The beads are then preferably aged and/or dried, depending upon the means employed to expand the beads.

Once the cup sidewall blank is cut to the desired size, it may be rolled into a cup sidewall shape and inserted into a female mold. A quantity of the pre-expanded beads is then uniformly spread over the bottom of the female mold. Enough beads are used so that upon closing the mold, the beads are mechanically compressed to form the cup bottom wall 25. About 0.5 grams of the above described pre-expanded beads provide a leakproof cup with an excellent bottom wall 25. It may be observed that it is possible to wrap the sidewall blank around a male mold and hold it in place by suction for further processing.

A male mold is then moved relatively into the female mold to leave a gap of about 30 mils in the sidewall area. Since the compressed foam sheet sidewall blank is less than 30 mils thick, the mold cavity permits expansion of the foam sheet to 30 mils thickness, thereby providing a uniformly thick sidewall 23. As seen in the drawings, the bead bottom wall 25 is preferably about twice as thick as the sheet sidewall 23. The closing of the molds effects compression of the foam beads, both to themselves and to the foam sheet. It should be noted that the molds may first be closed and then the beads injected into the closed mold cavity. Such a process would result in expansion of the beads, rather than compression, but would provide a leak-proof cup.

The molding cycle begins preferably by passing steam at a pressure of 30–60 p.s.i. through internal flow chambers of the molds for five to eight seconds. About two to three seconds after steam begins to pass through the internal flow chambers, live steam is introduced into the 30 mil mold gap to contact the foam for a period of 0.5 to 2.0 seconds. The live steam is preferable as a heat source as it effects a rapid expansion of the foam sheet, thereby filling the 30 mil mold gap.

Water at 80°F. to 95°F. is then circulated through the internal flow chambers of the molds to cool the molded cup 21. Cooling continues for approximately six seconds, the period usually required for the cup temperature to reach 160°F. Compressed air is then circulated through the molds for about two seconds to remove any remaining condensate or coolant. The molds open during the air purge phase of the cycle.

The molded cup 21 is then ejected into a top curling station if a rolled lip is desired. It is also possible to obtain a lip by using a set of molds allowing further expansion into a desired lip configuration. Ejection is accomplished by compressed air either with or without mechanical assist.

The molds are then purged either by internal streams of air or internal preheating with steam before the start of the next cycle.

It has been discovered that the steam molding, in addition to effecting rapid expansion of the foam, also provides a very shiny finish to the surfaces of the cup.

The above desired invention is a unique combination, but it would be equally possible to employ a sheet bottom with a beaded sidewall.

It is thought that the invention and many of its attendant advantages will be understood from the foregoing description and it will be apparent that various changes may be made in the form, construction and arrangement of the parts of the article and that changes may be made in the steps of the method described and their order of accomplishment without departing from the spirit and scope of the invention or sacrificing all of its material advantages, the form hereinbefore described being merely a preferred embodiment thereof.

What is claimed is:

1. A method for producing a disposable molded, lapped seam, fused foam plastic cup having leakproof seals between the bottom wall and sidewall and along the sidewall seam and wherein the side seam and the sidewall are of identical thickness comprising the steps of:
    a. providing an extruded, foamed plastic sheet material;
    b. compressing said sheet material to a thickness less than that of the final sidewall;
    c. forming a blank from said compressed sheet of suitable size and shape to form the sidewall of said cup;
    d. providing mold means comprising female and male mold members;
    e. providing pre-expanded foam beads in sufficient quantity to form the bottom wall of said cup;
    f. positioning said sidewall blank in said mold means;
    g. introducing said pre-expanded foam beads in the bottom of said female mold member;
    h. joining said mold members sufficiently to space them an amount greater than the thickness of said compressed sidewall blank and equal to the thickness of the final sidewall of said cup and
    i. molding and fusing said sidewall blank and foam beads in the presence of steam to expand said compressed sheet into the space between said mold members and to simultaneously compress, form and fuse a bottom wall from said foam beads to said sidewall.

2. The method of claim 1 wherein said mold members are preheated with steam.

3. The method of claim 1 wherein said foam beads comprise polystyrene.

4. The method of claim 1 wherein sufficient pre-expanded beads are employed to provide a bottom wall that is twice as thick as the sidewall.

5. The method of claim 1 wherein the thickness of said sheet material is about 35 to 40 mils as extruded, about 23 to 26 mils as compressed and about 30 mils after molding.

6. A method for producing a disposable molded, lapped seam, fused foam plastic cup having leakproof seals between the bottom wall and sidewall and along the sidewall seam and wherein the side seam and the sidewall are of identical thickness comprising the steps of:
    a. providing an extruded, foamed plastic sheet material;
    b. compressing said sheet material to a thickness less than that of the final sidewall;
    c. forming a blank from said compressed sheet of suitable size and shape to form the sidewall of said cup;
    d. providing mold means comprising female and male mold members;
    e. providing pre-expanded foam beads in sufficient quantity to form the bottom wall of said cup;
    f. positioning said sidewall blank in said mold means;
    g. joining said mold members sufficiently to space them an amount greater than the thickness of said compressed sidewall blank and equal to the thickness of the final sidewall of said cup;
    h. injecting preexpanded foam beads into the bottom of the closed mold and
    i. molding and fusing said sidewall blank and foam beads in the presence of steam to expand said compressed sheet into the space between said mold members and to simultaneously expand, form and fuse a bottom wall from said foam beads to said sidewall.

* * * * *